United States Patent
Fujita et al.

(10) Patent No.: US 8,299,909 B2
(45) Date of Patent: Oct. 30, 2012

(54) APPARATUS, METHOD AND PROGRAM FOR DETECTING DECREASE IN TIRE AIR PRESSURE INCLUDING MEANS TO REJECT DATA

(75) Inventors: Hajime Fujita, Nishinomiya (JP); Hiroaki Kawasaki, Ashiya (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 685 days.

(21) Appl. No.: 12/497,283

(22) Filed: Jul. 2, 2009

(65) Prior Publication Data

US 2010/0013617 A1    Jan. 21, 2010

(30) Foreign Application Priority Data

Jul. 15, 2008  (JP) .................................. 2008-183724

(51) Int. Cl.
    *G08B 21/00*  (2006.01)
(52) U.S. Cl. ........................ 340/444; 340/442; 73/146.5
(58) Field of Classification Search .......... 340/442–444; 73/146.2–146.5
    See application file for complete search history.

(56) References Cited

U.S. PATENT DOCUMENTS

2005/0171723 A1    8/2005  Koebe et al.

FOREIGN PATENT DOCUMENTS

| EP | 0578826 A1 | 1/1994 |
| JP | 6-163238 A | 7/1994 |
| JP | 3152151 B2 | 1/2001 |
| JP | 2005-1540 A | 1/2005 |
| JP | 2005-14664 A | 1/2005 |

OTHER PUBLICATIONS

Extended European Search Report dated Jul. 6, 2010 related European Application No. 09008631.5.

*Primary Examiner* — Jeffery Hofsass

(57) ABSTRACT

An apparatus for detecting a decrease in a tire air pressure includes; a rotation velocity information detection means for regularly detecting tire rotation velocity information regarding the respective wheels of a vehicle; a resonance frequency estimation means for estimating a resonance frequency of the rotation velocity information based on the rotation velocity information obtained by the rotation velocity information detection means; and a determination means for determining, based on the estimated resonance frequency, a decrease in the tire air pressure. The apparatus includes a data rejecting means for rejecting data of rotation velocity information hindering the estimation of the resonance frequency.

10 Claims, 9 Drawing Sheets

APPARATUS, METHOD AND PROGRAM FOR DETECTING DECREASE IN TIRE AIR PRESSURE INCLUDING MEANS TO REJECT DATA

BACKGROUND OF THE INVENTION

1. Field of the Invention

The present invention relates to an apparatus and a method for detecting a decrease in a tire air pressure of a running vehicle based on the resonance frequency of the tire as well as a program for detecting a decrease in a tire air pressure.

2. Description of the Related Art

Factors for enabling the safe running of an automobile include a tire air pressure. If the air pressure value decreases and is lower than an appropriate value, this may cause deteriorated operation stability and fuel efficiency to consequently cause a tire burst. To prevent this, a tire air pressure alarming apparatus (Tire Pressure Monitoring System; TPMS), which is to detect the decrease in a tire air pressure to notify a driver of this decrease to prompt the driver to take an appropriate measure, is an important technique from the viewpoints of environment conservation and the secured safety of the driver.

A conventional alarming apparatus can be classified into two types of the direct detecting-type one (direct TPMS) and the indirect detecting-type one (indirect TPMS). The direct TPMS directly measures a tire air pressure by providing a pressure sensor in a tire wheel. The direct TPMS can accurately detect a decrease in a tire air pressure but requires an exclusive wheel and has a poor fault-tolerance performance in an actual environment for example. Thus, the direct TPMS has disadvantages in technique and cost.

On the other hand, the indirect TPMS uses a method to estimate an air pressure based on the rotation information of a tire. The indirect TPMS can be further classified into the dynamic loaded radius (DLR)-type one and the resonance frequency mechanism (RFM)-type one. The DLR method uses a phenomenon according to which a tire having a reduced pressure collapses during running to cause a reduced dynamic loaded radius and this tire is consequently rotated at a speed higher than that of a tire having a normal pressure. The DLR method compares rotation velocities of four tires to thereby detect a pressure decrease. Since the DLR method can provide a relatively-easy computation using only a wheel rotation velocity signal obtained from a wheel speed sensor, the DLR method has been widely researched mainly for the purpose of detecting the puncture of one wheel. However, this DLR method merely makes a relative comparison among wheel rotation velocities and thus cannot sense a case of four tire simultaneous deflation (natural leakage). Furthermore, this DLR method also has a disadvantage in that this method cannot accurately sense a reduced pressure in all vehicle running statuses because a difference in the wheel speed is also caused by running conditions such as a vehicle turning, acceleration and deceleration, or an uneven load.

On the other hand, the RFM method is a method that uses a fact that a frequency characteristic of a wheel speed signal changes depending on a reduced tire pressure to thereby detect a difference between a reduced tire pressure and a normal tire pressure. In contrast with the DLR method, the RFM method is based on an absolute comparison between a certain value and the normal values of the respective wheels retained in advance. Thus, the RFM method can cope with a case of four tire simultaneous deflation and the RFM has collected attention as a better indirect detecting method. However, the RFM method is disadvantageous in that some running condition causes a strong noise for example and thus an estimated frequency value in a target domain is not robust enough with regard to a vehicle speed or a road surface condition for example. The present invention relates to a tire status sensing apparatus based on the RFM method. The following section will describe the basic principle of the RFM method in more detail.

When a vehicle is running, the torsional motion in the front-and-rear direction caused by the force to a tire from the road surface and the front-and-rear motion of the suspension have a coupled resonance. This resonance phenomenon also has an influence on the wheel rotation motion. Thus, a wheel speed signal obtained from a wheel sensor provided in an anti-lock braking system (ABS) also includes the information regarding the resonance phenomenon. The coupled resonance is based on a unique vibration mode caused by the torsional rigidity of a tire. Thus, the excitation status thereof changes depending only on a change in the air pressure constituting the physical characteristic of the tire and rarely depends on a change in the vehicle speed or the road surface. Specifically, when the air pressure decreases, the dynamics of the torsional motion of the tire changes. Thus, when the wheel speed signal is subjected to a frequency analysis for a case where a tire has a reduced pressure, a peak shown by the coupled resonance (resonance peak) appears at a lower frequency-side than in the case where the tire has a normal pressure.

FIG. 8 illustrates the power spectrum obtained by subjecting the respective wheel acceleration signals obtained during a fixed time (which are obtained by calculating time differences among wheel speed signals) to Fast Fourier Transform (FFT) regarding tires attached to a vehicle having a normal air pressure and tires having a pressure reduced by 25% from the normal pressure.

The components in the vicinity of 40 to 50 Hz show the vibration caused when the vibration of the tires in the front-and-rear direction is resonant with the suspension of the vehicle. As can be seen from the components, a change in the internal pressure causes a frequency having a peak value (resonance frequency) to move to the lower-frequency-side. Due to the above-described characteristic, this phenomenon appears independently from the tires, the vehicle type, the running speed, and the road surface condition for example. Thus, this RFM method focuses on this resonance frequency and issues an alarm when it is determined that the frequency is relatively lower than a reference frequency estimated during initialization. In this case, the resonance frequency must be estimated based on a wheel speed signal obtained from ABS. However, an in-vehicle calculator having a limited computational resource has a difficulty in storing required time-series data, thus making it difficult to carry out the FFT frequency analysis. Due to this reason, a conventional method estimates the resonance frequency based on an on-line method as will be described later.

Since vibration can be described by the 2-order model, a wheel speed signal is subjected to a time-series analysis based on the 2-order autoregressive (AR) model. Specifically, a parameter $\theta=\{a_1, \ldots, a_K\}$ in the model represented by the following formula (1) is estimated by the Kalman filter (iterative least squares technique).

$$y(t) = \sum_{i=1}^{K} a_i y(t-i) + \varepsilon \quad (1)$$

In this formula, y(t) represents a wheel speed at the time t, ε represents white noise, and K represents the model order. Since the frequency corresponding to the pole of the transfer function representing the AR model is estimated as a resonance frequency, the resonance frequency can be accurately obtained if a resonance peak is correctly extracted by the model.

However, many conventionally-suggested methods have disadvantages as described below. First, when a vehicle is running on a road having a smooth surface, the tires receive a weak force from the road surface and thus the resonance phenomenon is reduced. Consequently, noise mixed independently from a target signal has a relatively-increased influence. Specifically, a signal noise (SN) ratio is consequently poor and thus an accurate estimation of the resonance frequency is difficult. Secondly, when the vehicle is running at a high speed (80 km or more per hour), causing factors such as an increase in the up-and-down vibration of the tires cause a stronger signal having a high frequency component, thus causing a tendency where the resonance peak is unclear. Thirdly, when a strong noise has a peak in the vicinity of a frequency domain having a resonance peak, the influence by this noise causes an unstable estimated resonance frequency value. FIG. 9 shows the result obtained by applying FFT to the running data obtained under the circumstance as described above. Some running condition causes these problems to be superimposed, thus making it particularly difficult to estimate a resonance frequency in a stable manner. Furthermore, an unstable estimated value also makes it difficult to set a reference value for determining abnormality, which is a causing factor that makes it difficult to put an abnormality detection system based on the RFM method into practical use.

As a method for solving the disadvantage of the RFM method as described above, a method has been disclosed in Japanese Unexamined Patent Publication No. 2005-14664. This method performs initializations and estimates by the number of combinations of causing factors having an influence on the estimation of the air pressure (i.e., road surface, vehicle speed, and temperature). The specification of Japanese Patent No. 3152151 discloses that external factors having an influence on the resonance frequency are three factors of an outside temperature, a vehicle speed, and the vibration from the road surface to a tire. By using a correction function determined in advance based on any two or all of these three external factors, an estimated value is corrected depending on the circumstance. However, in the case of the method disclosed in Japanese Unexamined Patent Publication No. 2005-14664, the total of 27 windows are required when three types are assumed for the respective causing factors. Initialization of all of these 27 windows is not only complicated but also causes a case where a not-yet-initialized window cannot be subjected to the determination of abnormality. Another method also has been suggested according to which a not-initialized window is interpolated by the interpolation and extrapolation based on surrounding windows. However, since the interpolation method is not based on a tire physical characteristic, the abnormality detection accuracy has a poor reliability.

Furthermore, the correction function according to the specification of Japanese Patent No. 3152151 is also not based on the physical characteristic. Thus, the abnormality detection has a problematic universality.

SUMMARY OF THE INVENTION

The present invention has been made in view of the situation as described above. It is an objective of the present invention to provide an apparatus and a method for detecting a decrease in a tire air pressure by which the estimation accuracy regarding a resonance frequency of a wheel rotation signal can be increased, and a program for detecting a decrease in a tire air pressure.

In accordance with a first aspect of the present invention, there is provided an apparatus for detecting a decrease in a tire air pressure (hereinafter simply referred to as "detection apparatus") including:

a rotation velocity information detection means for regularly detecting tire rotation velocity information regarding the respective wheels of a vehicle;

a resonance frequency estimation means for estimating, based on the rotation velocity information obtained by the rotation velocity information detection means, a resonance frequency of the rotation velocity information; and a determination means for determining, based on the estimated resonance frequency, a decrease in the tire air pressure; wherein:

the apparatus includes a data rejecting means for rejecting data of rotation velocity information hindering the estimation of the resonance frequency.

In the detection apparatus according to the first aspect of the present invention, when the resonance frequency of the rotation velocity information is estimated, instead of using all pieces of obtained rotation velocity information, data of rotation velocity information hindering the estimation accuracy of the resonance frequency is rejected by the data rejecting means. This can consequently improve the estimation accuracy of the resonance frequency and thus a tire deflation can be detected accurately.

The data rejecting means can be configured so that, when the rotation velocity information is cut to have a predetermined time length and the cut rotation velocity information is analyzed and when a predetermined frequency domain including the resonance frequency does not include a resonance peak or includes two or more resonance peaks, the data rejecting means rejects the cut rotation velocity information. According to this configuration, among the rotation velocity information cut to have a predetermined time length, the rotation velocity information considered to hinder the estimation of the resonance frequency is rejected. This can consequently improve the estimation accuracy of the resonance frequency. In other words, by rejecting the data including nonsteady noise for example, the steadiness of the data used to estimate the resonance frequency can be secured, thus improving the estimation accuracy.

In accordance with a second aspect of the present invention, there is provided a detection apparatus including:

a rotation velocity information detection means for regularly detecting tire rotation velocity information regarding the respective wheels of a vehicle;

a rotation acceleration information computation means for computing tire rotation acceleration information based on the rotation velocity information obtained by the rotation velocity information detection means;

a resonance frequency estimation means for estimating a resonance frequency of the rotation acceleration information based on the rotation acceleration information computed by the rotation acceleration information computation means; and a determination means for determining, based on the estimated resonance frequency, a decrease in the tire air pressure, wherein:

the apparatus includes a data rejecting means for rejecting data of rotation acceleration information hindering the estimation of the resonance frequency.

In the detection apparatus according to the second aspect of the present invention, when the resonance frequency of the rotation acceleration information is estimated, instead of using all of pieces of obtained rotation acceleration information, the data rejecting means is used to reject data of rotation acceleration information hindering the estimation of the resonance frequency. This can consequently improve the estimation accuracy of the resonance frequency and thus a tire deflation can be detected accurately.

The data rejecting means can be configured so that, when the rotation acceleration information is cut to have a predetermined time length and the rotation acceleration information is analyzed and when a predetermined frequency domain including the resonance frequency does not include a resonance peak or includes two or more resonance peaks, the data rejecting means rejects the cut rotation acceleration information. According to this configuration, among the rotation acceleration information cut to have a predetermined time length, the rotation acceleration information considered to hinder the estimation of the resonance frequency is rejected. This can consequently improve the estimation accuracy of the resonance frequency. In other words, by rejecting data including nonsteady noise for example, the steadiness of the data used to estimate the resonance frequency can be secured, thus improving the estimation accuracy.

The predetermined frequency domain can be a domain ranging from 6-7 Hz below to 6-7 Hz above the resonance frequency. Through this domain, data including noise having an adverse influence on the estimation can be effectively rejected while maintaining the reliability of the estimation accuracy.

The determination means can be configured so that the determination means determines that a tire air pressure decreases when a difference between a resonance frequency at a normal air pressure stored in advance as a reference frequency and the resonance frequency estimated by the resonance frequency estimation means is larger than a predetermined threshold value.

In accordance with a third aspect of the present invention, there is provided a method of detecting a decrease in an a tire air pressure (hereinafter simply referred to as "detection method") including:

a step of regularly detecting tire rotation velocity information regarding the respective wheels of a vehicle;

a step of estimating, based on the rotation velocity information obtained by the rotation velocity information detection means, a resonance frequency of the rotation velocity information; and a step of determining a decrease in the tire air pressure based on the estimated resonance frequency, wherein:

the method includes a step of rejecting data of rotation velocity information hindering the estimation of the resonance frequency.

In the detection method according to the third aspect of the present invention, when the resonance frequency of the rotation velocity information is estimated, instead of using all pieces of obtained rotation velocity information, data of rotation velocity information hindering the estimation of the resonance frequency is rejected by the data rejecting means. This can consequently improve the estimation accuracy of the resonance frequency and thus a tire deflation can be detected accurately.

The step of rejecting data can be configured so that, when the rotation velocity information is cut to have a predetermined time length and is analyzed and when a predetermined frequency domain including the resonance frequency does not include a resonance peak or includes two or more resonance peaks, the cut rotation velocity information is rejected. According to this configuration, among the rotation velocity information cut to have a predetermined time length, the rotation velocity information considered to hinder the estimation of the resonance frequency is rejected. This can consequently improve the estimation accuracy of the resonance frequency. In other words, by rejecting data including nonsteady noise for example, the steadiness of the data used to estimate the resonance frequency can be secured, thus improving the estimation accuracy.

In accordance with a fourth aspect of the present invention, there is provided a detection method including:

a step of regularly detecting tire rotation velocity information regarding the respective wheels of a vehicle;

a step of computing tire rotation acceleration information based on the rotation velocity information obtained by the rotation velocity information detection means;

a step of estimating a resonance frequency of the rotation acceleration information based on the rotation acceleration information computed by the rotation acceleration information computation means; and a step of determining a decrease in the tire air pressure based on the estimated resonance frequency, wherein:

the method includes a step of rejecting data of rotation acceleration information hindering the estimation of the resonance frequency.

In the detection method according to the fourth aspect of the present invention, when the resonance frequency of the rotation acceleration information is estimated, instead of using all pieces of obtained rotation acceleration information, data of rotation acceleration information hindering the estimation of the resonance frequency is rejected by the data rejecting means. This can consequently improve the estimation accuracy of the resonance frequency and thus a tire deflation can be detected accurately.

The step of rejecting data can be configured so that, when the rotation acceleration information is cut to have a predetermined time length and is analyzed and when a predetermined frequency domain including the resonance frequency does not include a resonance peak or includes two or more resonance peaks, the cut rotation acceleration information is rejected. According to this configuration, among the rotation acceleration information cut to have a predetermined time length, the rotation acceleration information considered to hinder the estimation of the resonance frequency is rejected. This can consequently improve the estimation accuracy of the resonance frequency. In other words, by rejecting data including nonsteady noise for example, the steadiness of the data used to estimate the resonance frequency can be secured, thus improving the estimation accuracy.

The predetermined frequency domain can be a domain ranging from 6-7 Hz below to 6-7 Hz above the resonance frequency. Through this domain, data including noise having an adverse influence on the estimation can be effectively rejected while maintaining the reliability of the estimation accuracy.

The determinating step can determine that a tire air pressure decreases when a difference between a resonance frequency at a normal air pressure stored in advance as a reference frequency and the resonance frequency estimated by the resonance frequency estimation means is larger than a predetermined threshold value.

In accordance with a fifth aspect of the present invention, there is provided a program for detecting a decrease in a tire air pressure (hereinafter simply referred to as "program") for causing, in order to detect a decrease in a tire air pressure based on a resonance frequency of tires of a running vehicle, a computer to function as:

a resonance frequency estimation means for estimating a resonance frequency of the rotation velocity information based on rotation velocity information obtained by a rotation velocity information detection means for regularly detecting tire rotation velocity information regarding the respective wheels of a vehicle;

a determination means for determining, based on the estimated resonance frequency, a decrease in the tire air pressure; and a data rejecting means for rejecting data of rotation velocity information hindering the estimation of the resonance frequency.

In accordance with a sixth aspect of the present invention, there is provided a program for causing, in order to detect a decrease in a tire air pressure based on a resonance frequency of tires of a running vehicle, a computer to function as:

a rotation acceleration information computation means for computing tire rotation acceleration information based on rotation velocity information obtained by a rotation velocity information detection means for regularly detecting tire rotation velocity information regarding the respective wheels of a vehicle;

a resonance frequency estimation means for estimating a resonance frequency of the rotation acceleration information based on the rotation acceleration information computed by the rotation acceleration information computation means;

a determination means for determining, based on the estimated resonance frequency, a decrease in the tire air pressure; and a data rejecting means for rejecting data of rotation acceleration information hindering the estimation of the resonance frequency.

DETAILED DESCRIPTION

The following section will describe in detail, with reference to the attached drawings, an embodiment of an apparatus and a method for detecting a decrease in a tire air pressure and a program for detecting a decrease in a tire air pressure of the present invention.

Figure 1:
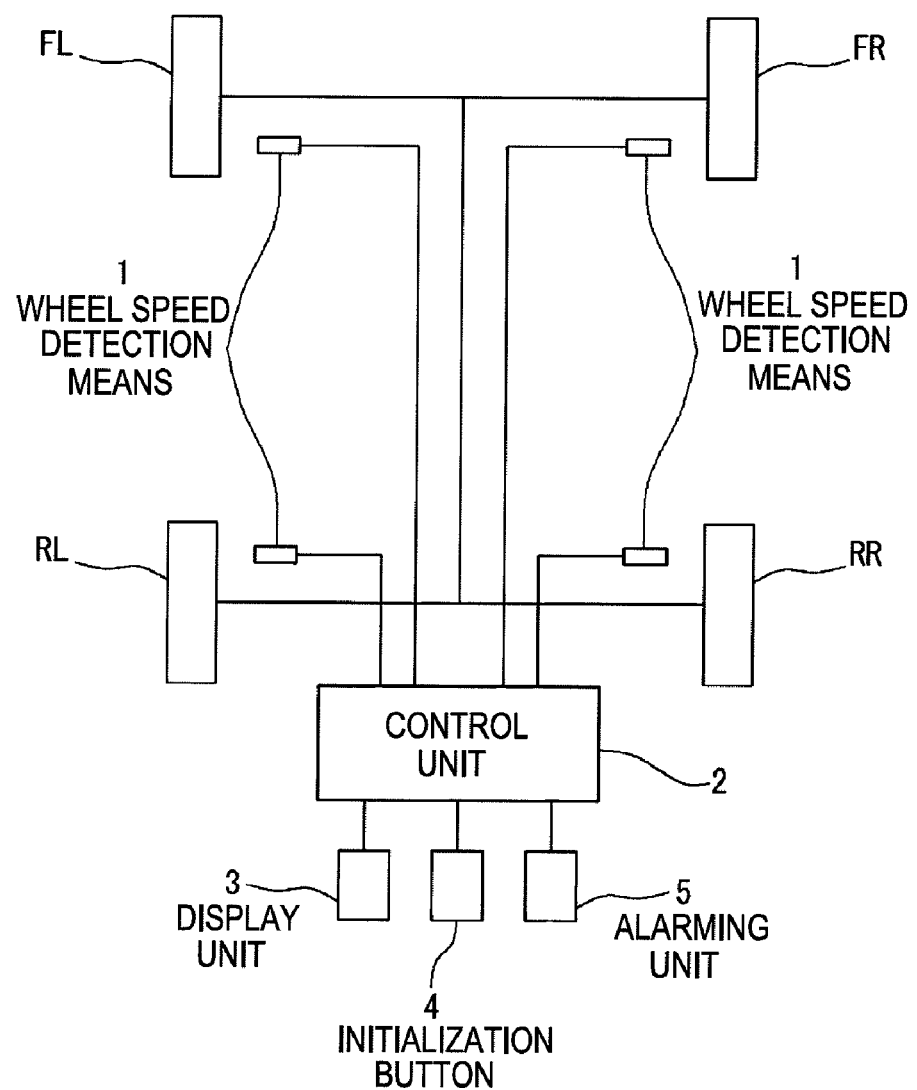
FIG. 1 is a block diagram illustrating one embodiment of a detection apparatus of the present invention.

As shown in FIG. 1, the detection apparatus according to one embodiment of the present invention includes, in order to detect rotation velocity information regarding four tires provided in a four-wheel vehicle (left front wheel (FL), right front wheel (FR), left rear wheel (RL), and right rear wheel (RR)), a normal wheel speed detection means (rotation velocity information detection means) 1 provided in association with the respective tires.

The wheel speed detection means 1 may be, for example, a wheel speed sensor that uses an electromagnetic pickup for example to generate a rotation pulse to measure an angular velocity and a wheel speed based on the number of pulses or an angular velocity sensor such as the one that generates power using rotation as in a dynamo to measure an angular velocity and a wheel speed based on this voltage. The output from the wheel speed detection means 1 is given to a control unit 2 that is a computer such as ABS. This control unit 2 is connected to a display unit 3 composed of a liquid crystal display element, a plasma display element or CRT for example for displaying a tire having a decreased pressure, an initialization button 4 that can be operated by a driver, and an alarming unit 5 for notifying a driver of a tire having a decreased pressure.

Figure 2:
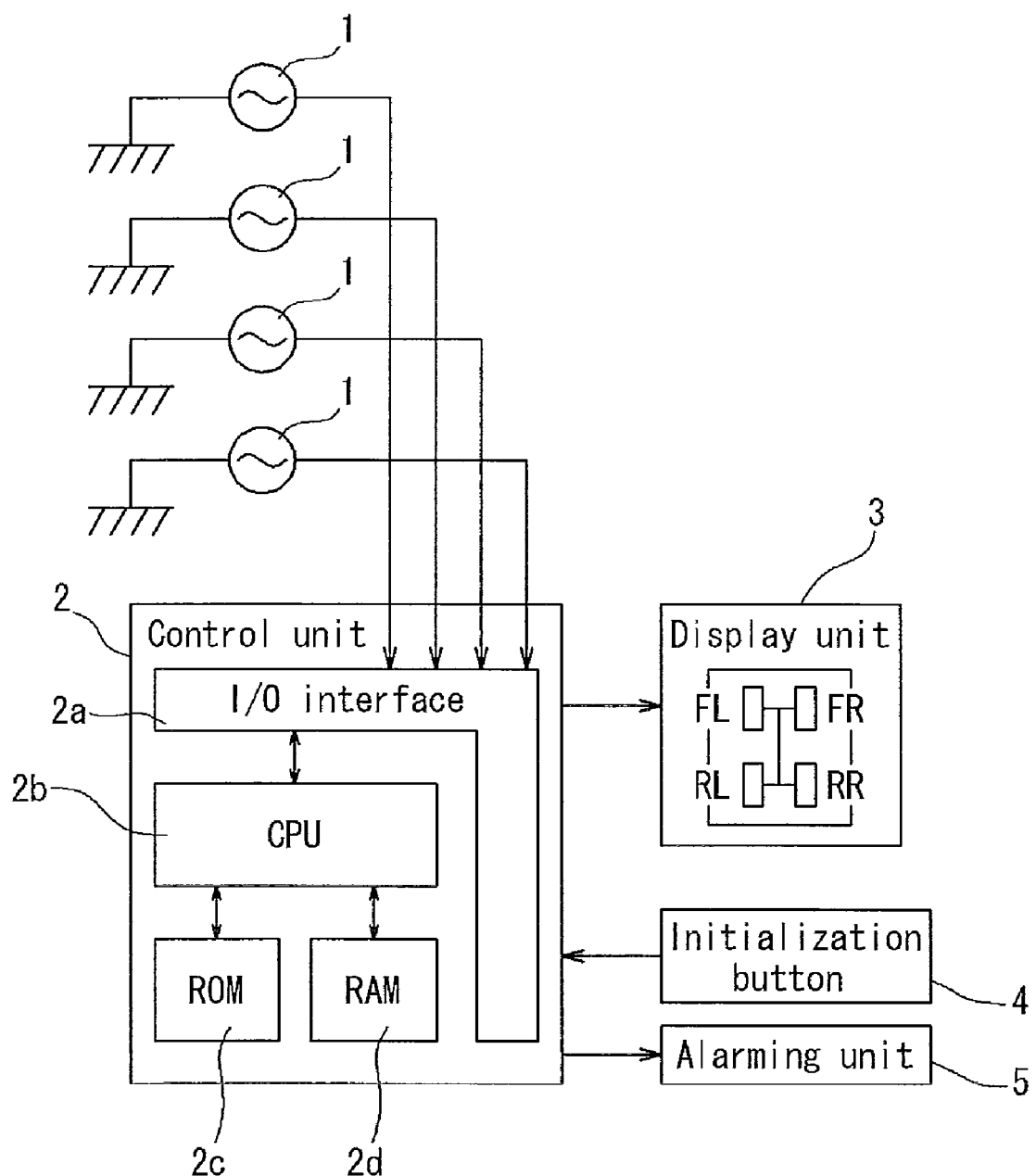
FIG. 2 is a block diagram illustrating an electrical configuration of the detection apparatus shown in FIG. 1.

As shown in FIG. 2, the control unit 2 is composed of: an I/O interface 2a required for the exchange of a signal with an external apparatus; a CPU 2b functioning as a computation processing center; a ROM 2c storing therein a control operation program of this CPU 2b; and a RAM 2d to which data is temporarily written when the CPU 2b performs a control operation or from which the written data is read out.

The wheel speed detection means 1 outputs a pulse signal corresponding to the rotation number of a tire (hereinafter also referred to as "wheel speed pulse"). Then, by sampling this wheel speed pulse at a predetermined sampling cycle $\Delta T$ (second) (e.g., $\Delta T=0.005$ seconds), the time-series data for the wheel speed signal can be obtained. Since the resonance frequency of a target tire in the torsional direction appears in the vicinity of several tens of Hz, the sampling cycle must be equal to or higher than several tens of Hz.

The detection apparatus according to this embodiment is mainly composed of: a wheel speed detection means (rotation velocity information detection means) 1; a resonance frequency estimation means for estimating the resonance frequency of the rotation velocity information based on the rotation velocity information obtained by the wheel speed detection means; a determination means for determining, based on the estimated resonance frequency, a decrease in the tire air pressure; and a data rejecting means for rejecting the data of rotation velocity information hindering the estimation of the resonance frequency. A program for detecting a decrease in a tire air pressure allows the control unit 2 to function as the resonance frequency estimation means, the determination means, and the data rejecting means.

In the present invention, in order to improve the circumstance where the detection of an abnormality of a tire air pressure is difficult due to the dependence on the running condition, the time length of to-be-handled data is reduced and data assumed as not contributing to the improvement of the estimation accuracy is rejected and only the remaining data is used to estimate the resonance frequency. The expression of "the circumstance where the detection of an abnormality of a tire air pressure is difficult" means a circumstance where a target resonance peak is unclear due to an influence by noise for example or the resonance frequency cannot be accurately estimated.

A part of the data is rejected in the present invention due to the following reason.

When a frequency characteristic is estimated, a necessary requirement is that data used is steady. However, the longer time the data has, the more difficult it is to assume that the data is steady. Specifically, tires of a running vehicle receive various stimuli from the road surface. Such stimuli are considered to include nonsteady noise due to conditions of road surface and the mechanical system of the vehicle for example. Thus, there is a possibility where such noise breaks the steadiness of the data required for estimation to thereby decrease the estimation accuracy. Therefore, it is inferred that the unclear resonance peak caused when the vehicle attached with high-rigidity tires runs on a smooth road surface is due to the fact that the data for which the steadiness cannot be secured causes the result that includes various temporally-changing influences having a complicated relation.

Figure 3:
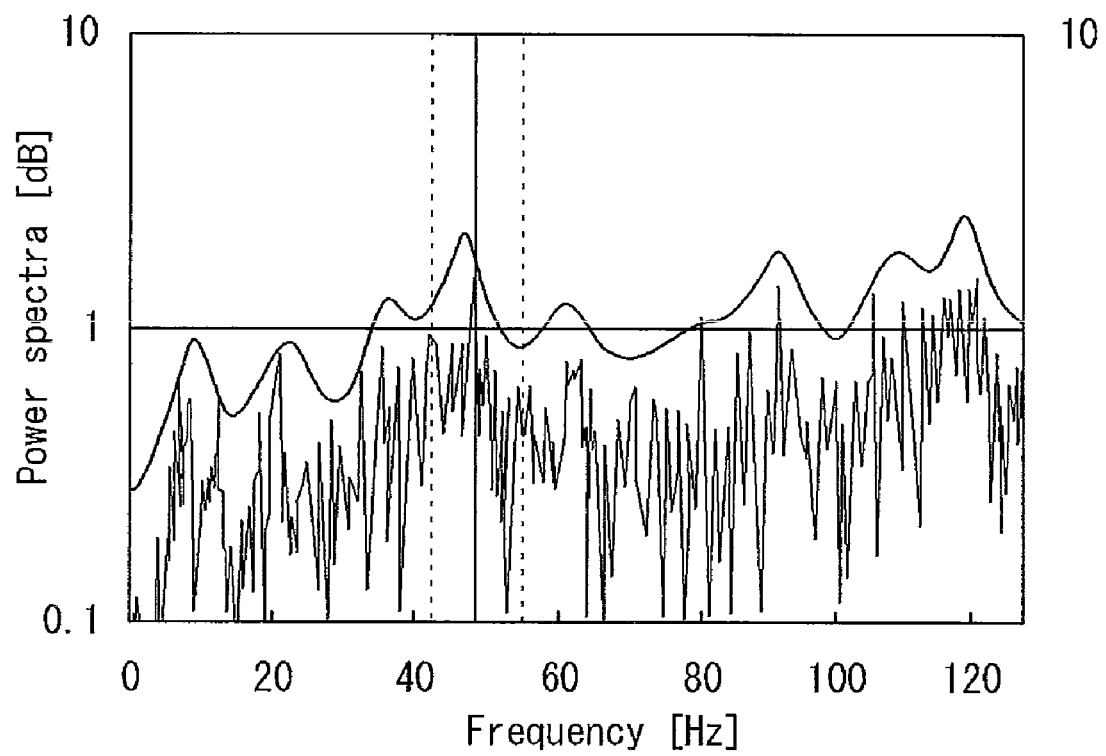
FIG. 3 illustrates the power spectrum regarding a certain data segment.
Figure 9:
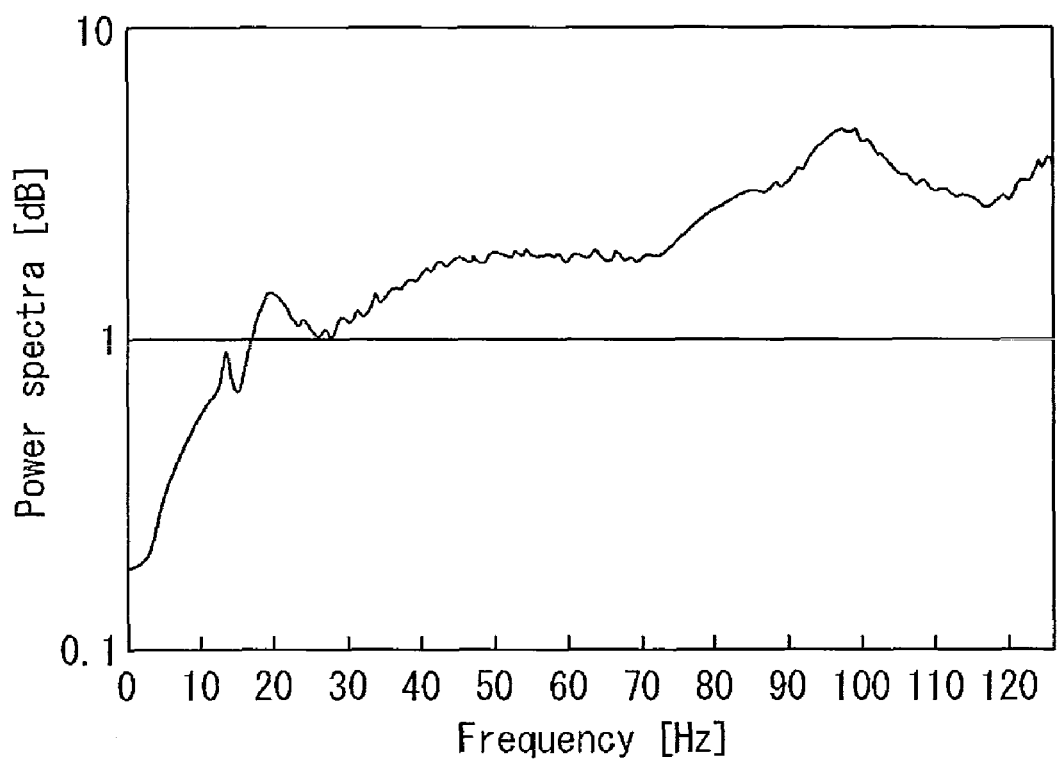
FIG. 9 illustrates the power spectrum obtained by applying FFT to wheel acceleration signals corresponding to two minutes when the vehicle attached with runflat tires runs on a road having a smooth road surface at a high speed.

To solve this, the present invention handles data having a length shorter than that in conventional cases and rejects data considered as hindering the improvement of the estimation accuracy. By doing this, a more secure steadiness is assured and the estimation of the resonance frequency is performed. The analysis result regarding the cut short data includes data for which a resonance peak appears relatively clearly because an influence by nonsteady noise is small. When only such data is used to calculate the spectral mean, a peak can be more clearly confirmed than in the case where the entire data is used. As a result, abnormality can be detected in a more accurate manner than the conventional method and abnormality detection is robust in a change in the environment. FIG. 3 illustrates the power spectrum (thin line) obtained by applying FFT to a certain part corresponding to 2.5 seconds cut from the wheel acceleration data obtained in two minutes as in FIG. 9 and the power spectrum (thick line) estimated by calculating AR parameters by a Kalman filter based on a 20-order AR model. As can be seen from FIG. 3, the unclear resonance peak when attention is paid on the characteristic in a time span of 2 minutes appears clearly in a certain short time (2.5 seconds).

Next, the operation of the detection apparatus of this embodiment will be described sequentially.

(1) First, the wheel speed detection means detects a wheel rotation signal.

(2) Next, the wheel rotation signal is sampled based on a predetermined sampling cycle to thereby obtain the time-series data regarding the wheel speed signal. The sampling cycle can be selected from cycles in a range from 1 to 8 ms for example.

(3) Next, the time difference among the resultant wheel speed signals is calculated and is assumed as a wheel acceleration signal. The wheel speed data also can be subjected to a time-series analysis as time-series data. However, the wheel acceleration data has a smaller change than that of the wheel speed data. Thus, the use of the wheel acceleration data is desired from the viewpoint of improving the computation accuracy.

(4) Next, the resultant time-series data regarding the wheel acceleration is cut out by a predetermined length (the cut short-time data will be hereinafter also referred to as "data segment"). The conventional method has used a wheel speed signal or a wheel acceleration signal extracted in a time length of about one to two minutes. However, the present invention uses data corresponding to a shorter time than in the case of the conventional method. The time length of the cut-out data is desirably minimized from the viewpoint of more securely eliminating noise. However, the shorter time length the cut-out data has, the poorer the frequency resolution of the result of the analysis of the data is. To prevent this, the minimum time length is set in a range within which a frequency resolution desired to be secured is not damaged. This time length is not particularly limited in the present invention but is generally in a range from 0.5 to 15 seconds.

The frequency resolution must have an accuracy required to detect an abnormality in the tire air pressure. When a difference in the resonance frequency between a tire having a normal pressure and a tire having a reduced pressure (this difference will be hereinafter referred to as "margin") is 1.5 Hz for example, the required frequency resolution is 1.5 Hz or more. Thus, when the sampling cycle is 4 ms, the required number of pieces of data included in the data segment is 375 or more ((1÷0.004 seconds)×1.5 Hz=375).

(5) Next, the respective cut data segments are subjected to a time-series analysis. This time-series analysis can use an autoregressive (AR) model having an appropriate order (e.g., 2 to 20). The estimation of AR parameters can be performed by preferably a Kalman filter (iterative least squares technique). However, instead of the Kalman filter, algorithms such as Yule-Walker method, Burg method, or covariance method also may be used.

(6) Next, when the spectrum in a predetermined frequency domain including the resonance frequency satisfies any of the following conditions 1) to 3), the data segment is determined as not contributing to the improvement of the estimation accuracy of the resonance frequency and is rejected.

1) A local maximum spectrum value does not exist in the frequency domain.

2) A plurality of local maximum spectrum values exist in the frequency domain.

3) The frequency having the maximum value in the frequency domain corresponds to an end point (a Hz or b Hz when the predetermined frequency domain is in a range from a Hz to b Hz).

The tire resonance frequency is unique to each tire. The resonance phenomenon appears due to the torsional rigidity of the tire side wall. Thus, the tire resonance frequency is a value that is determined mainly based on the magnitude of this torsional rigidity. Accurately calculating a true resonance frequency of a rolling tire is not easy because the tire has an extremely-complicated physical characteristic. When a frequency analysis by a FFT for example is performed with regard to the data regarding the wheel acceleration signal obtained from a vehicle running on a road having a significantly-uneven and rough road surface at a low speed (about 50 km/h), the resonance peak appears clearly. Thus, this resonance frequency can be considered as a "true resonance frequency" of the tire. This resonance frequency R is generally 35 to 55 Hz in the case of tires of a general passenger automobile, although the resonance frequency is different depending on the type of the tire or vehicle as described above.

In this embodiment, a spectrum existing in the predetermined frequency domain including the resonance frequency R is subjected to determination for determining whether the data is rejected or not. This "predetermined frequency domain" is not particularly limited in the present invention. However, the predetermined frequency domain is selected as the widest range that satisfies both of a condition according to which the range includes both of the resonance frequency at a normal tire pressure and the resonance frequency at a reduced tire pressure and a condition according to which the range does not include other peaks appearing in the vicinity of the resonance frequency due to an influence by noise. Specifically, it is known, from experiences and experiments, that the predetermined frequency domain desirably includes a domain ranging from 6-7 Hz below to 6-7 Hz above the resonance frequency. When the resonance frequency at a normal tire pressure is assumed as 48 Hz for example, the predetermined frequency domain is desirably 42 to 55 Hz. If the predetermined frequency domain is wider than the domain ranging from 6-7 Hz below to 6-7 Hz above the resonance frequency, this causes an increased probability at which a plurality of peaks exist in the range, thus causing a situation where most part of the data is rejected to thereby fail to provide a reliable frequency analysis. If the frequency domain is excessively narrow on the other hand, this prevents a peak considered as a resonance peak from being found to thereby also fail to provide a reliable frequency analysis again.

(7) Next, the spectra obtained by subjecting the respective not-rejected data segments to a time-series analysis are averaged to thereby calculate the resonance frequency. Then, this resonance frequency is compared with the resonance frequency calculated in advance at the normal tire pressure (reference frequency). If the comparison shows a difference therebetween that is higher than a predetermined threshold value (e.g., 2 Hz), a decrease in the tire air pressure is determined to thereby issue an alarm to the driver.

EXAMPLE

Next, an example of the detection method of the present invention will be described. However, the present invention is not limited to the following example only.

Runflat tires (size: 245/40R18) were attached to a four-wheel-drive vehicle of 2800 cc displacement. Then, the vehicle was made to run and the rotation information regarding the respective tire wheels was sampled at every 4 ms to obtain the time-series data for the wheel speed signal. Then, a time difference among the resultant wheel speeds was calculated to thereby obtain a wheel acceleration. The following four running conditions were used.

(a) Running on a road having a significantly-uneven road surface at a low speed (50 km per hour)

(b) Running on a road having a smooth road surface at a low speed (50 km per hour)

(c) Running on a road having a significantly-uneven road surface at a high speed (100 km per hour)

(d) Running on a road having a smooth road surface at a high speed (100 km per hour)

The extracted time-series data was cut out to correspond to a time length of 2.5 seconds. The cut data segment was subjected to a time-series analysis by a 20-order AR model. The AR parameters were estimated by the Kalman filter (iterative least squares technique).

It was known in advance from experiments and experiences that the resonance frequency of the runflat tires used in the experiment appeared in the vicinity of substantially 48 Hz. Thus, when a spectrum within a range from 42 to 55 Hz as a frequency domain including this resonance frequency satisfied any of the following conditions 1) to 3), the data segment was determined as not contributing to the improvement of the estimation accuracy of the resonance frequency and was rejected.

1) The local maximum spectrum value does not exist in the frequency domain.

2) A plurality of local maximum spectrum values exist in the frequency domain.

3) A frequency having the maximum value in the frequency domain corresponds to an end point (42 Hz or 55 Hz).

Next, the spectra obtained by subjecting the respective not-rejected data segments to a time-series analysis were averaged to calculate the resonance frequency. The result is shown in FIGS. 4 to 7.

[Evaluation of Robustness of Estimation Under Different Running Conditions]

Figure 4:
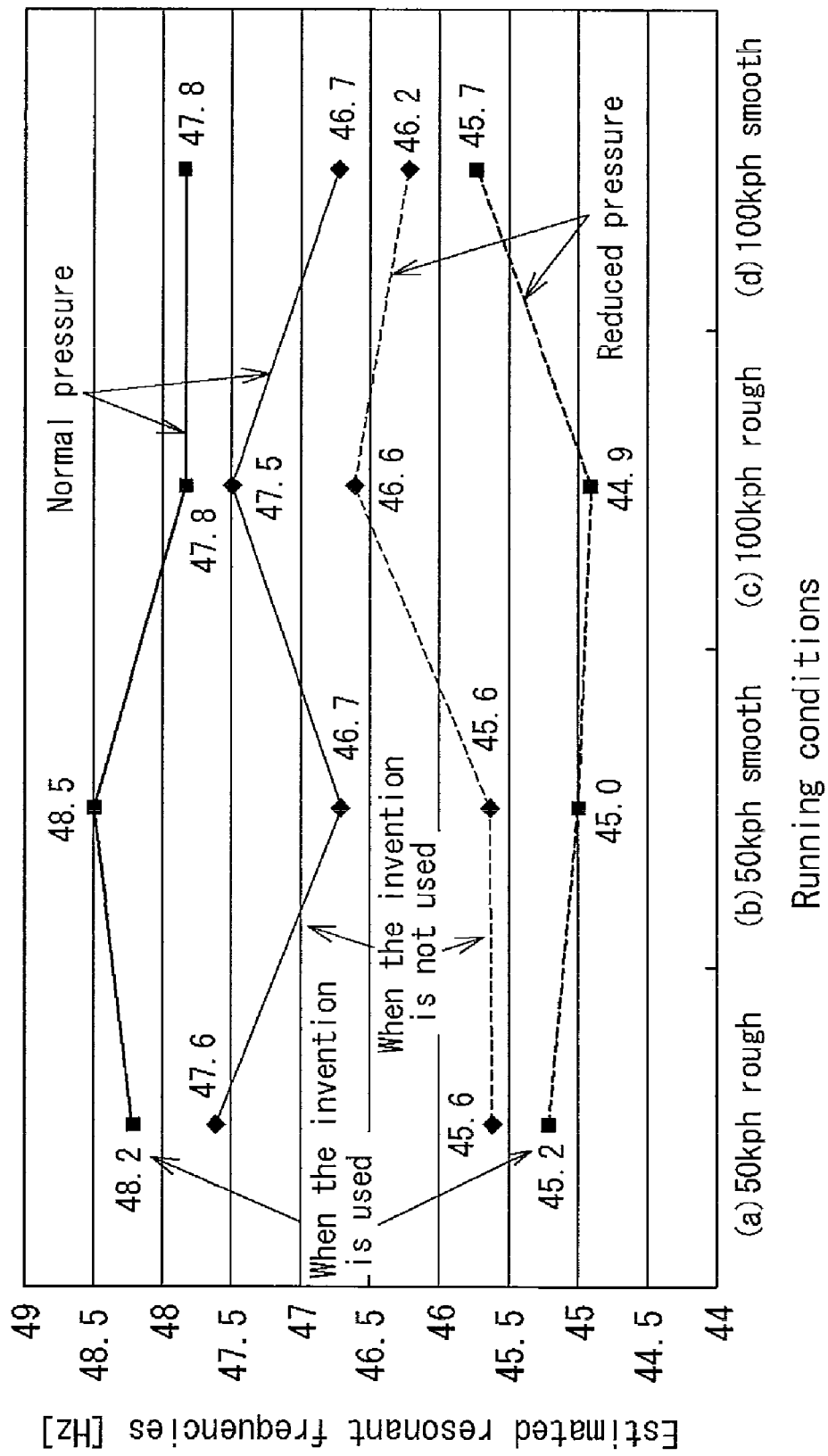
FIG. 4 shows resonance frequencies estimated under four different running conditions.

FIG. 4 shows the result of the comparison regarding the estimated resonance frequencies between a case where the present invention was applied and a case where the present invention was not applied under the above-described four different running conditions. In FIG. 4, the horizontal axis represents the four running conditions composed of, from left to right, (a) running on a road having a significantly-uneven road surface at a low speed (50 km per hour), (b) running on a road having a smooth road surface at a low speed (50 km per hour), (c) running on a road having a significantly-uneven road surface at a high speed (100 km per hour), and (d) running on a road having a smooth road surface at a high speed (100 km per hour). The thick solid line and the thick broken line represent resonance frequencies at a normal tire pressure and a reduced tire pressure (25%-reduced tire pressure) estimated under the respective running conditions when the present invention was applied. The thin solid line and thin broken line represent resonance frequencies at a normal tire pressure and a reduced tire pressure (25%-reduced tire pressure) estimated under the respective running conditions when the present invention was not applied. Average resonance frequencies and the standard deviations under the respective running conditions were 48.08±0.34 when the invention was used at the normal pressure, 47.13±0.49 when the invention was not used at the normal pressure, 45.20±0.36 when the invention was used at the reduced pressure, and 46.00±0.49 when the invention was not used at the reduced pressure.

When the present invention is not used, the resonance frequencies estimated under the respective running conditions are smaller than a correct resonance frequency (about 48 Hz) and show a high variation depending on a change in the running condition. This is presumably due to the fact that noise inferably derived from the mechanical system of the vehicle caused when the vehicle is running at a high speed for example appears in the vicinity of the resonance frequency in a nonsteady manner to thereby constitute a large peak that hinders desired time-series analysis and extract of a resonance peak from being achieved. The unstable estimated values also cause a small margin, thus making it difficult to set a threshold value for detecting an abnormality.

In contrast with this, the cases where the present invention is used show such estimated resonance frequency values that are robust to a change in the running condition. Furthermore, when the cases where the present invention is used are compared with the cases where the present invention is not used, the former shows a larger margin and thus can allow a threshold value to be set easily. This is presumably due to the fact that the above-described method has rejected data for which the resonance peak cannot be correctly extracted due to an influence by noise for example. As described above, the present invention can solve the disadvantage that the resonance frequency changes depending on a running condition.

[When Vehicle Runs On Road Having Significantly-Uneven Road Surface at Low Speed]

Figure 5:
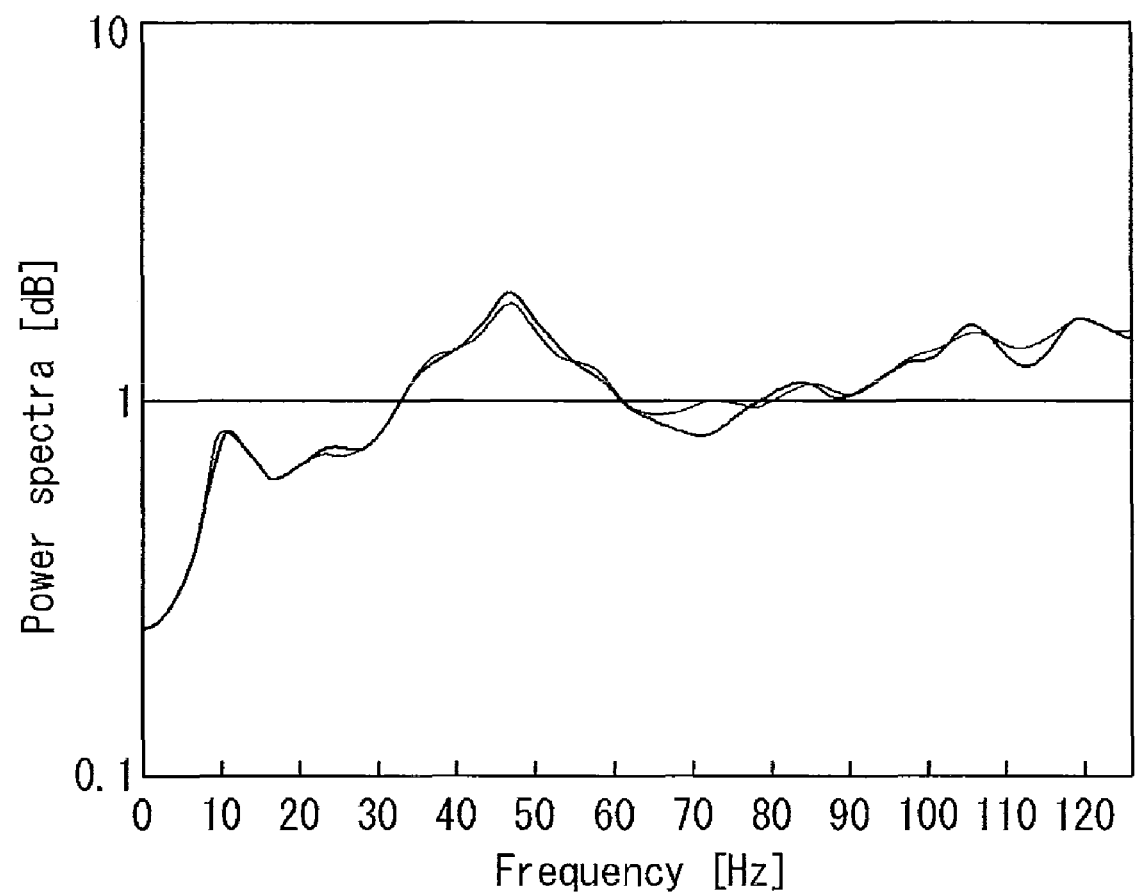
FIG. 5 illustrates the frequency characteristic of a wheel acceleration signal when a vehicle runs on a road having a significantly-uneven road surface at a low speed.

FIG. 5 shows the frequency characteristic obtained when a vehicle runs on a road having a significantly-uneven road surface at a low speed. In FIG. 5, the thick solid line represents the spectra obtained regarding the data segments not rejected by the above-described method and the thin solid line represents the spectra obtained for all data segments. As can be seen from FIG. 5, in the case of this running condition, the resonance peak can be judged relatively easily without using the present invention. However, the use of the present invention allows the resonance peak to appear more clearly.

Since the above-described method was used to remove the data segment having an unstable peak shape due to noise for example, the stability of the estimation of the resonance frequency was improved. As a result, the accuracy and the robustness of the abnormality detection can be improved.

[When Vehicle Runs On Road Having Smooth Road Surface at Low Speed]

Figure 6:
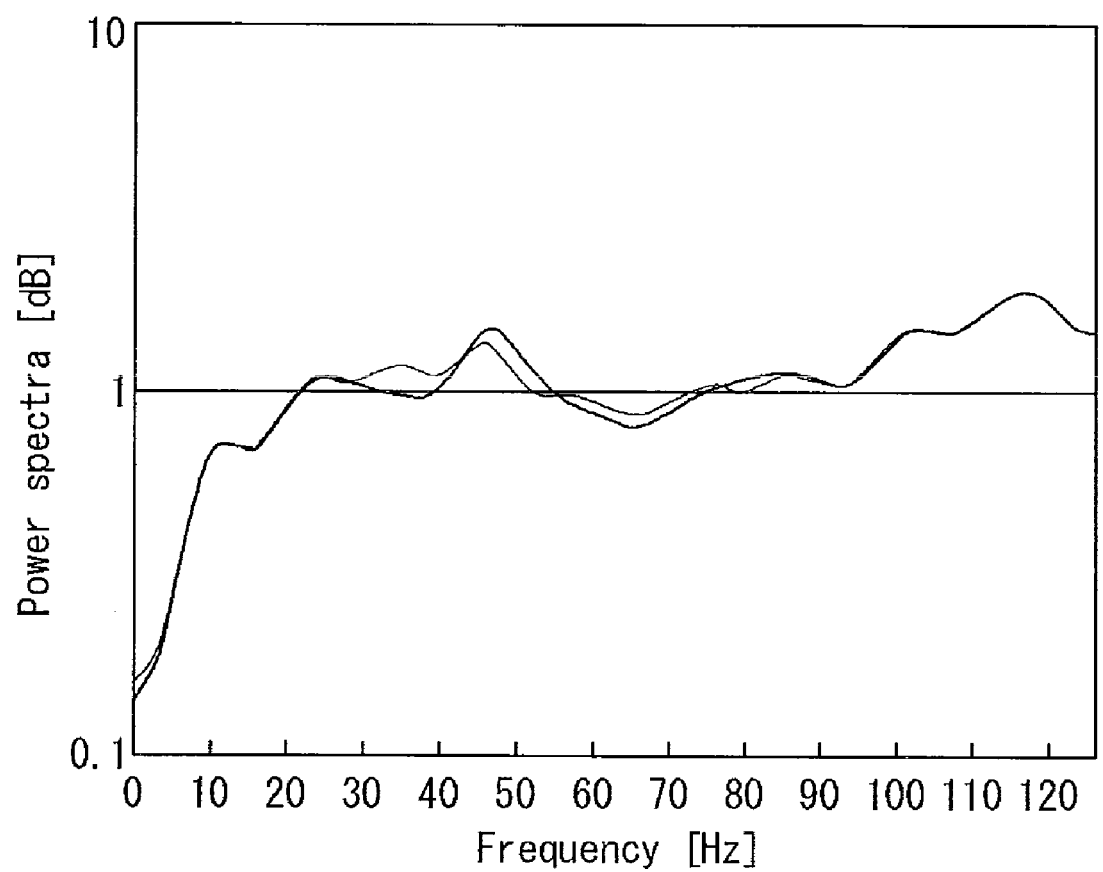
FIG. 6 illustrates the frequency characteristic of a wheel acceleration signal when a vehicle runs on a road having a smooth road surface at a low speed.

FIG. 6 shows the frequency characteristic obtained when a vehicle runs on a road having a smooth road surface at a low speed. In FIG. 6, thick solid line represents the spectra obtained regarding the data segments not rejected by the above-described method and the thin solid line represents the spectra obtained regarding all data segments. The resonance peak by the spectral average for all data segments slightly moves from a correct resonance peak position to the low frequency-side. However, by using the present invention, the resonance peak is sharpened and an adverse influence by noise can be reduced.

[When Vehicle Runs On Road Having a Smooth Road Surface at High Speed]

Figure 7:
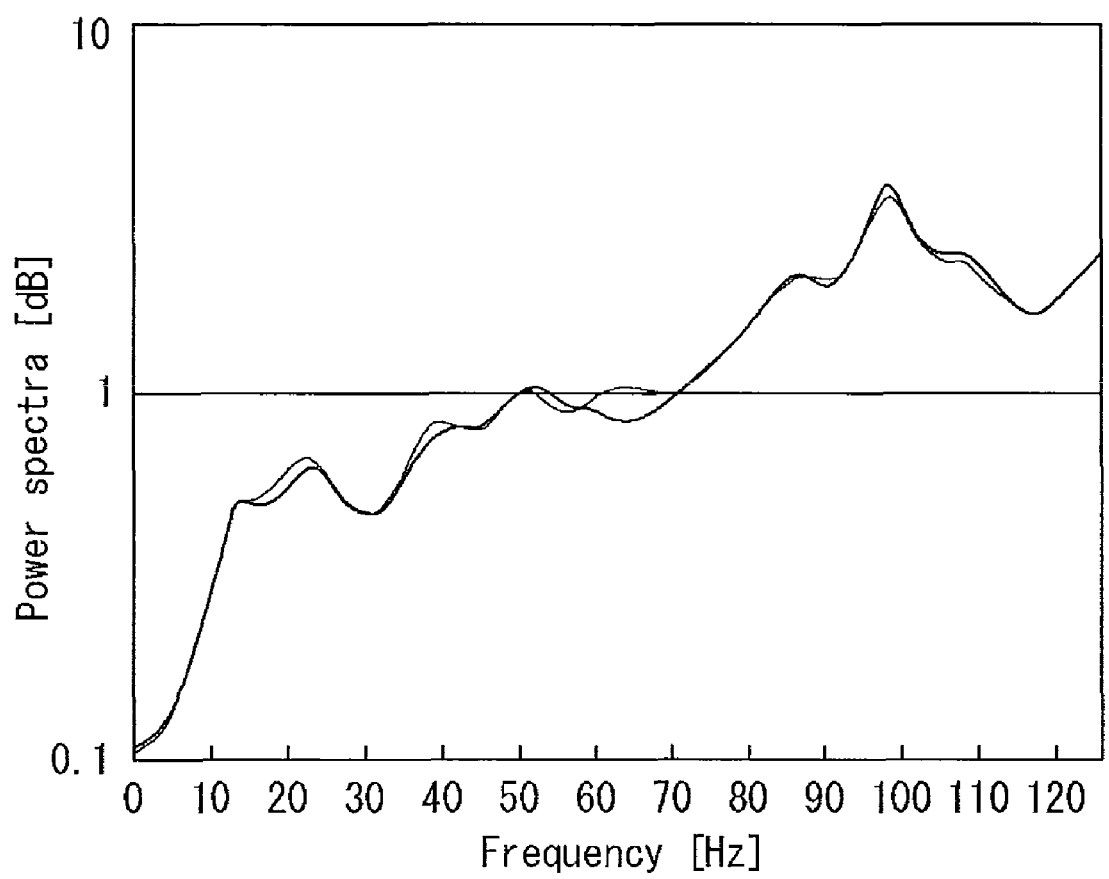
FIG. 7 illustrates the frequency characteristic of a wheel acceleration signal when a vehicle runs on a road having a smooth road surface at a high speed.
Figure 8:
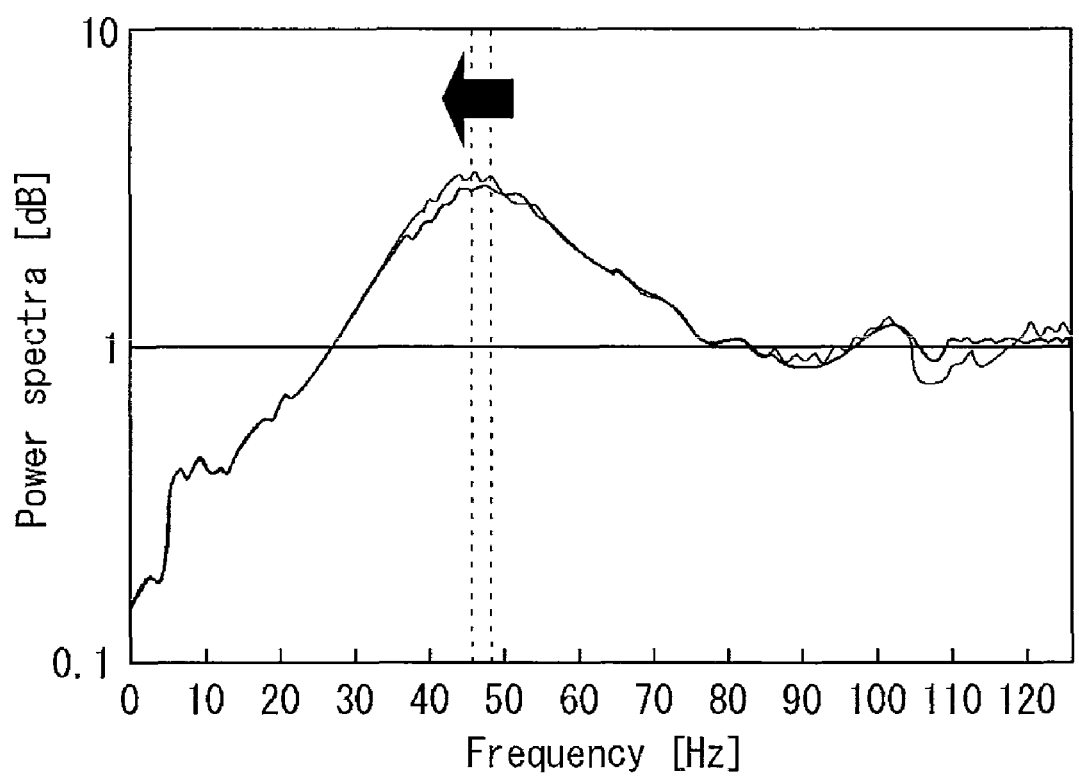
FIG. 8 illustrates the power spectrum obtained by applying FFT to wheel acceleration signals obtained in two minutes.

FIG. 7 shows the frequency characteristic obtained when the vehicle runs on a road having a smooth road surface at a high speed. In FIG. 7, the thick solid line represents the spectra obtained regarding the data segments not rejected by the above-described method and the thin solid line represents the spectra obtained regarding all data segments. By running at a high speed, noise inferably due to the mechanical system of the vehicle for example appears in a nonsteady manner to thereby constitute a large peak that hinders a desired time-series analysis, thereby causing an unclear resonance peak. However, by using the present invention, an adverse influence by such noise can be reduced and a clearer resonance peak than that of the original spectra (spectra obtained regarding all data segments) can be obtained. As a results the accuracy and robustness in the abnormality detection can be improved.

What is claimed is:

1. An apparatus for detecting a decrease in a tire air pressure, comprising:
   a rotation velocity information detection means for regularly detecting tire rotation velocity information regarding the respective wheels of a vehicle;
   a resonance frequency estimation means for estimating, based on the rotation velocity information obtained by the rotation velocity information detection means, a resonance frequency of the rotation velocity information; and
   a determination means for determining, based on the estimated resonance frequency, a decrease in the tire air pressure; wherein
   the apparatus includes a data rejecting means for rejecting data of rotation velocity information hindering the estimation of the resonance frequency; and wherein
   the data rejecting means is configured so that, when the rotation velocity information is cut to have a predetermined time length and the cut rotation velocity information is analyzed and when a predetermined frequency domain including the resonance frequency does not include a resonance peak or includes two or more resonance peaks, the data rejecting means rejects the cut rotation velocity information.

2. An apparatus for detecting a decrease in a tire air pressure, comprising:
   a rotation velocity information detection means for regularly detecting tire rotation velocity information regarding the respective wheels of a vehicle;
   a rotation acceleration information computation means for computing tire rotation acceleration information based on the rotation velocity information obtained by the rotation velocity information detection means;
   a resonance frequency estimation means for estimating a resonance frequency of the rotation acceleration information based on the rotation acceleration information computed by the rotation acceleration information computation means; and
   a determination means for determining, based on the estimated resonance frequency, a decrease in the tire air pressure; wherein
   the apparatus includes a data rejecting means for rejecting data of rotation acceleration information hindering the estimation of the resonance frequency; and wherein
   the data rejecting means is configured so that, when the rotation acceleration information is cut to have a predetermined time length and the cut rotation acceleration information is analyzed and when a predetermined frequency domain including the resonance frequency does not include a resonance peak or includes two or more resonance peaks, the data rejecting means rejects the cut rotation acceleration information.

3. The apparatus for detecting a decrease in a tire air pressure according to claim 1, wherein the predetermined frequency domain includes a domain ranging from 6-7 Hz below to 6-7 Hz above the resonance frequency.

4. The apparatus for detecting a decrease in a tire air pressure according to claim 1, wherein the determination means determines that a tire air pressure decreases when a difference between a resonance frequency at a normal air pressure stored in advance as a reference frequency and the resonance frequency estimated by the resonance frequency estimation means is larger than a predetermined threshold value.

5. A method of detecting a decrease in a tire air pressure, comprising:
   a step of regularly detecting tire rotation velocity information regarding the respective wheels of a vehicle;
   a step of estimating, based on the rotation velocity information obtained by the rotation velocity information detection means, a resonance frequency of the rotation velocity information; and
   a step of determining a decrease in the tire air pressure based on the estimated resonance frequency; wherein
   the method includes a step of rejecting data of rotation velocity information hindering the estimation of the resonance frequency; and wherein
   the step of rejecting data is configured so that, when the rotation velocity information is cut to have a predetermined time length and the cut rotation velocity information is analyzed and when a predetermined frequency domain including the resonance frequency does not include a resonance peak or two or more resonance peaks, the cut rotation velocity information is rejected.

6. A method of detecting a decrease in a tire air pressure, comprising:
   a step of regularly detecting tire rotation velocity information regarding the respective wheels of a vehicle;
   a step of computing tire rotation acceleration information based on the rotation velocity information obtained by the rotation velocity information detection means;

a step of estimating a resonance frequency of the rotation acceleration information based on the rotation acceleration information computed by the rotation acceleration information computation means; and a step of determining a decrease in the tire air pressure based on the estimated resonance frequency; wherein the method includes a step of rejecting data of rotation acceleration information hindering the estimation of the resonance frequency; and wherein the step of rejecting data is configured so that, when the rotation acceleration information is cut to have a predetermined time length and the cut rotation acceleration information is analyzed and when a predetermined frequency domain including the resonance frequency does not include a resonance peak or includes two or more resonance peaks, the cut rotation acceleration information is rejected.

7. The method of detecting a decrease in a tire air pressure according to claim 5, wherein the predetermined frequency domain includes a domain ranging from 6-7 Hz below to 6-7 Hz above the resonance frequency.

8. The method of detecting a decrease in a tire air pressure according to claim 5, wherein the determination step determines that a tire air pressure decreases when a difference between a resonance frequency at a normal air pressure stored in advance as a reference frequency and the resonance frequency estimated by the resonance frequency estimation means is larger than a predetermined threshold value.

9. A program stored on a computer-readable medium for causing, in order to detect a decrease in a tire air pressure based on a resonance frequency of tires of a running vehicle, a computer to function as:

a resonance frequency estimation means for estimating a resonance frequency of the rotation velocity information based on rotation velocity information obtained by a rotation velocity information detection means for regularly detecting tire rotation velocity information regarding the respective wheels of a vehicle;

a determination means for determining, based on the estimated resonance frequency, a decrease in the tire air pressure; and a data rejecting means for rejecting data of rotation velocity information hindering the estimation of the resonance frequency; wherein the data rejecting means is configured so that, when the rotation velocity information is cut to have a predetermined time length and the cut rotation velocity information is analyzed and when a predetermined frequency domain including the resonance frequency does not include a resonance peak or includes two or more resonance peaks, the data rejecting means rejects the cut rotation velocity information.

10. A program stored on a computer-readable medium for causing, in order to detect a decrease in a tire air pressure based on a resonance frequency of tires of a running vehicle, a computer to function as:

a rotation acceleration information computation means for computing tire rotation acceleration information based on rotation velocity information obtained by a rotation velocity information detection means for regularly detecting tire rotation velocity information regarding the respective wheels of a vehicle;

a resonance frequency estimation means for estimating a resonance frequency of the rotation acceleration information based on the rotation acceleration information computed by the rotation acceleration information computation means;

a determination means for determining, based on the estimated resonance frequency, a decrease in the tire air pressure; and a data rejecting means for rejecting data of rotation acceleration information hindering the estimation of the resonance frequency; wherein the data rejecting means is configured so that, when the rotation acceleration information is cut to have a predetermined time length and the cut rotation acceleration information is analyzed and when a predetermined frequency domain including the resonance frequency does not include a resonance peak or includes two or more resonance peaks, the data rejecting means rejects the cut rotation acceleration information.

* * * * *